United States Patent [19]

Hikawa et al.

[11] Patent Number: 4,617,526
[45] Date of Patent: Oct. 14, 1986

[54] SYNC RESPONSIVE CLOCK GENERATOR FOR DIGITAL DEMODULATORS

[75] Inventors: Kazuo Hikawa, Tokyo; Kazuya Toyomaki, Zama; Hiroyuki Yamazaki, Yokohama, all of Japan

[73] Assignee: Victor Company of Japan, Ltd., Yokohama, Japan

[21] Appl. No.: 715,246

[22] Filed: Mar. 25, 1985

[30] Foreign Application Priority Data

Mar. 26, 1984 [JP] Japan .................................. 59-57580

[51] Int. Cl.⁴ .......................... H03L 7/16; H03L 7/20
[52] U.S. Cl. ..................................... 331/1 A; 307/516; 307/526; 328/134; 331/11; 331/25; 375/120
[58] Field of Search ...................... 331/1 A, 11, 12, 25; 375/120

[56] References Cited

U.S. PATENT DOCUMENTS

| | | | |
|---|---|---|---|
| 3,982,194 | 9/1976 | Chi et al. | 331/1 A X |
| 4,003,086 | 1/1977 | Larsen et al. | 360/53 |
| 4,023,116 | 5/1977 | Alfke et al. | 331/11 X |
| 4,131,920 | 12/1978 | Berger | 360/51 |
| 4,191,976 | 3/1980 | Braun | 360/51 |
| 4,325,090 | 4/1982 | Janak et al. | 360/51 |

Primary Examiner—Eugene R. LaRoche
Assistant Examiner—James C. Lee
Attorney, Agent, or Firm—Cushman, Darby & Cushman

[57] ABSTRACT

A clock generator for digital demodulators is disclosed wherein a voltage-controlled oscillator (19) generates clock pulses at controlled frequency and phase in response to error signals from a phase comparator (14) and a frequency comparator (12). The phase error signal represents a phase deviation of the clock from a window pulse which is generated in response to a predetermined transition between binary "1"s and binary "0"s of an input bit stream. The frequency comparator detects a synchronization code in the input bit stream to derive the frequency error signal by counting the number of clock pulses present in the period of the detected synchronization code.

26 Claims, 10 Drawing Figures

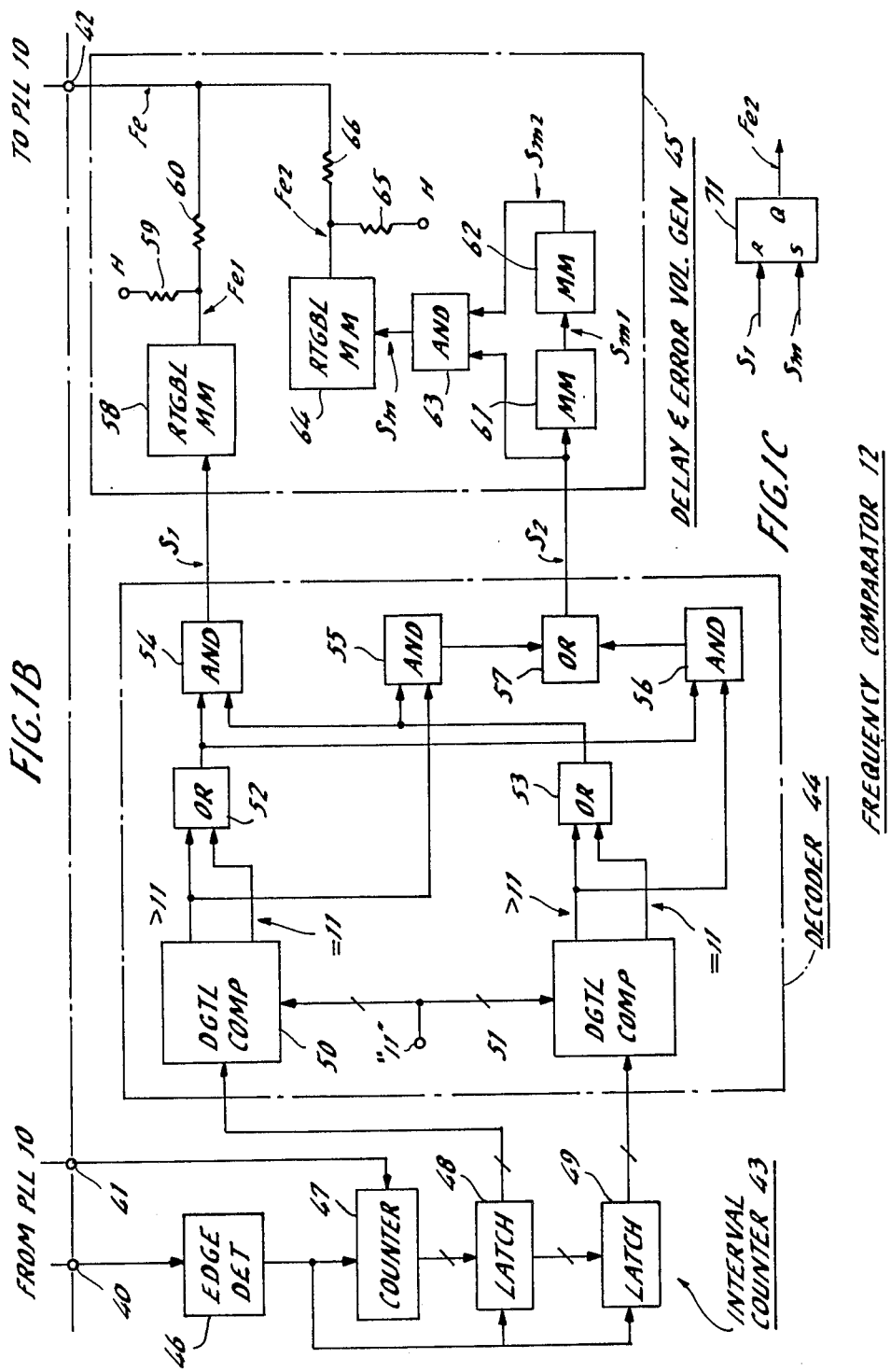

4,617,526

SYNC RESPONSIVE CLOCK GENERATOR FOR DIGITAL DEMODULATORS

BACKGROUND OF THE INVENTION

The present invention relates to clock generators, and more specifically, it relates to a clock generator for deriving clock information from a digital bit stream. The invention is particularly suitable for demodulating an eight-to-fourteen modulation (EFM) bit stream which is derived from digital audio discs such as "compact discs".

In compact disc recording a digital modulation technique, known as eight-to-fourteen modulation (EFM), is employed whereby original eight bit codes of random clock spacings are converted to fourteen bit codes of the format having a minimum spacing of three clock pulses and a maximum spacing of eleven clock pulses to provide enough tracking information for laser beam to follow tracks and enough clock information for disc players to demodulate the EFM bit stream. The fourteen-bit codes are formatted into a series of data blocks, or "frames" each being identified by a 24-bit frame sync code composed of consecutive series of eleven bits of "1"s and eleven bits of "0"s plus two binary "1"s.

Conventional clock generators employed in compact disc players include circuitry that detects a series of data bits having the minimum and maximum clock spacings and counts clock pulses generated by a voltage-controlled oscillator which are present during the minimum and maximum spacings of the detected data bits. Two count values are derived as a measure of the frequency of the clock pulse and used to control the operating frequency of the oscillator. One disadvantage of the prior art is that it requires many circuit components with a resultant increase in cost. Another disadvantage resides in the fact that since the data bits of minimum and maximum clock spacings occur at random the phase-locked loop is likely to remain out-of-phase with the input bit stream for a substantial period if successive frames contain no data bits having mininum and maximum clock spacings.

SUMMARY OF THE INVENTION

It is therefore an object of the present invention to provide a clock generator which is simple in circuit design and stable in clock frequency.

This object is obtained by deriving a frequency control signal from the frame sync of an input bit stream.

The clock generator of the invention is adapted to receive a bit stream of a frame format having a frame sync and comprises a voltage-controlled oscillator for generating clock pulses, means for generating a window pulse in response to a predetermined transition between binary "1"s and binary "0"s in the bit stream, a phase comparator responsive to the window and clock pulses for generating a phase control signal representing the difference in phase between the window pulse and the clock pulse, and a frequency comparator. The frequency comparator is responsive to the bit stream and the clock pulses to detect the synchronization code and detect the number of clock pulses present during the period of the detected synchronization code and further generate a frequency control signal of different levels according to the detected number of clock pulses. The phase and frequency control signals are combined and applied to the voltage-controlled oscillator to control the phase and frequency of the clock pulses.

The periodicity of the frame sync allows the clock generator to quickly return to phase-locked state as soon as the clock frequency deviates from the normal frequency value. Since it is only required to detect the sync code for frequency control, the circuitry is made simpler than the prior art.

BRIEF DESCRIPTION OF THE DRAWINGS

The present invention will be described in further detail with reference to the accompanying drawings, in which:

FIG. 1B is a block diagram of a frequency comparator constructed according to the invention;

FIG. 1C is an illustration of a modified form of the frequency comparator;

DETAILED DESCRIPTION

Figure 1A:
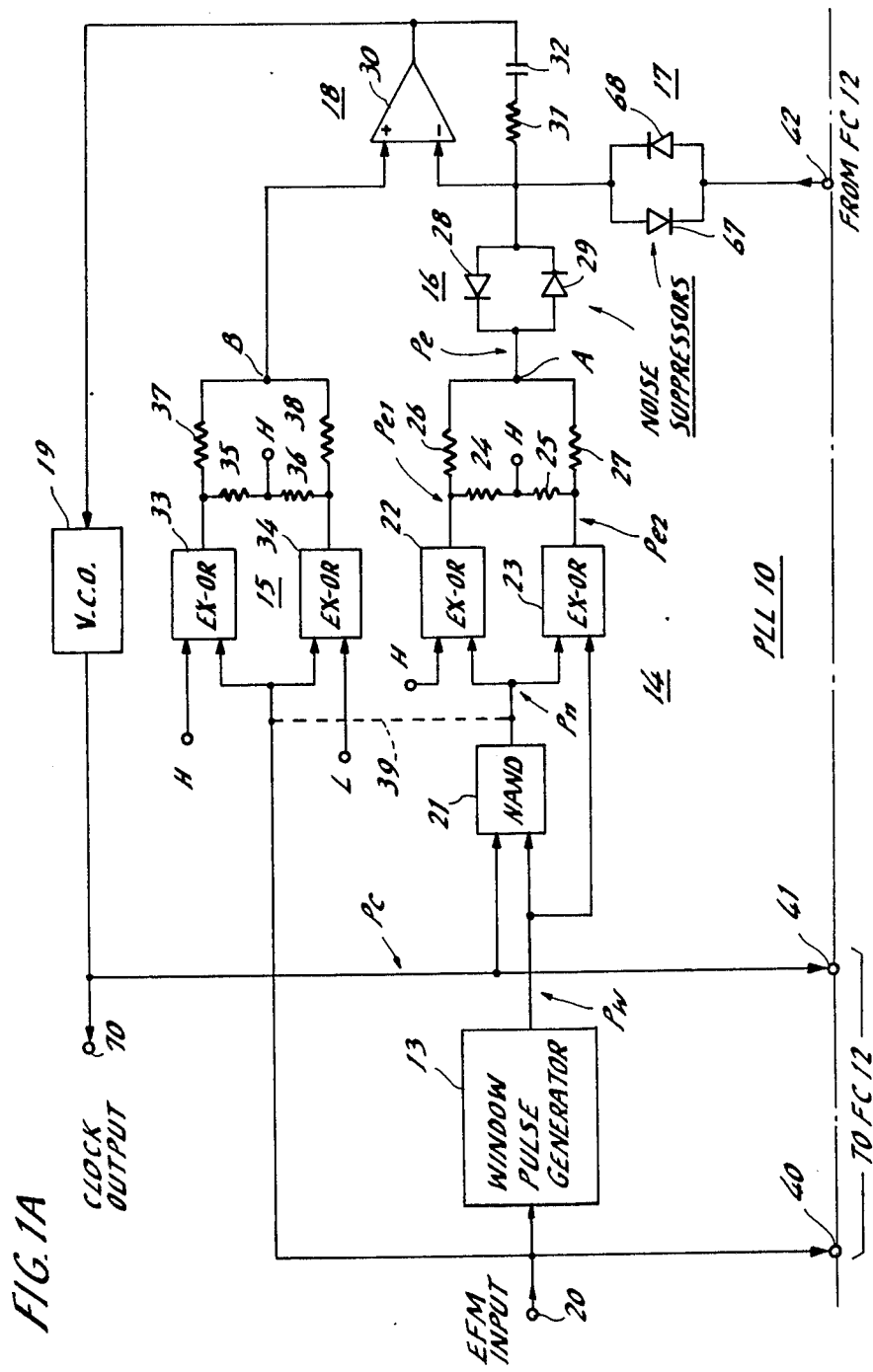
FIG. 1A is a block diagram of a phase-locked loop of the invention.

In FIGS. 1A and 1B, there is shown a preferred embodiment of the clock generator of the present invention. The clock generator comprises a phase-locked loop 10 shown in FIG. 1A and a frequency comparator 12 shown separately in FIG. 1B. The phase-locked loop 10 includes a window pulse generator 13, a phase comparator 14, a reference circuit 15, noise suppressors 16, 17, a differential integrator 18 and a voltage controlled oscillator 19. Window pulse generator 13 is connected to an input terminal 20 to which a digitally modulated bit stream is applied.

The input signal is derived from a digital audio disc, known as compact disc, in which the original 16-bit digital sample of 44.1 kHz is subjected to eight-to-fourteen modulation (EFM). According to this digital modulation, the original 16 bit code is divided into upper and lower binary significant groups of eight bits each and each group is converted to a 14-bit code in which binary "1"s occur at calculated maximum intervals to make it less likely to lose clock timing on playback. The EFM modulated bit stream is formatted into a series of data blocks, or frames of 588 bits, each identified by a 24-bit frame sync code. The frame sync code comprises a succession of eleven bits of "1"s and eleven bits of "0"s followed by two bits "1"s at the beginning of each frame. The frame sync code is followed by a data bit stream in which binary "1"s occur at a minimum spacing of 3 clock intervals and at a maximum spacing of 11 clock intervals. Binary "1"s and binary "0"s in the input bit stream present high and low voltages, respectively, at the input terminal 20. The frame sync code forms a consecutive train of a positive-going pulse of 11-clock period and a negative-going pulse of the same period and the data bits form a series of randomly occurring positive-going pulses.

Figure 2:
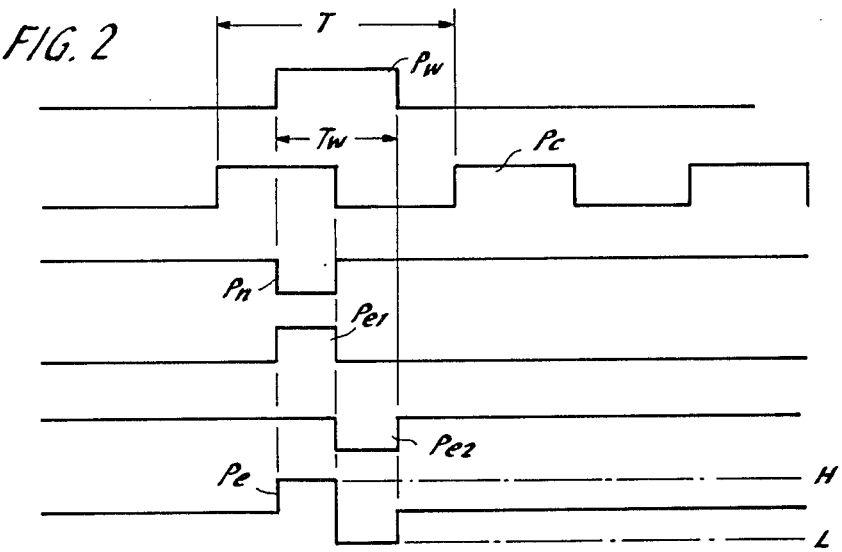
FIG. 2 is a waveform diagram useful for describing the operation of the phase-locked loop.

The window pulse generator 13 is responsive to the transition of binary level that occurs at the rising edge and/or falling edge of the positive-going pulses of the input bit stream and generates a window pulse Pw of a duration Tw smaller than the pulse spacing T of clock pulses Pc generated by the voltage controlled oscillator 19. The waveforms of these pulses are shown at FIG. 2. Preferably, the window and clock pulses have equal pulse duration.

The phase comparator 14 comprises a NAND gate 21, Exclusive-OR gates 22 and 23, and a resistor network formed by a first series of resistors 24, 25 and a second series of resistors 26, 27 both connected across the outputs of Exclusive-OR gates 22 and 23. One input of each Exclusive-OR gate is connected to the output of NAND gate 21 and the other input of Exclusive-OR gate 22 is connected to logical high level source. The other input of gate 23 is connected to the output of window pulse generator 13. A junction between resistors 24 and 25 is connected to a voltage source having a logical high level corresponding to binary "1" and a junction A between resistors 26 and 27 is connected through noise suppressor 16 to the inverting input of an operational amplifier 30. Resistors 26 and 27 form an analog adder circuit by which the voltages at the outputs of Exclusive-OR gates 22 and 23 are arithmetically summed at junction A. Resistors 24, 25, 26 and 27 are selected so that the junction A is normally maintained at a medium potential M at which clock pulses Pc and window pulses Pw are in exact phase.

Window pulses are supplied to one input of NAND gate 21 to be compared in phase with clock pulses from the oscillator 19. The phase difference between these pulses results in the generation of a negative-going pulse Pn whose leading edge is coincident with the leading edge of window pulse Pw and whose trailing edge is coincident with the trailing edge of clock pulse Pc, as shown in FIG. 2.

Exclusive-OR gate 22 provides a first, positive-going phase error pulse $Pe_1$ which is reverse in polarity to the input pulse Pn. Exclusive-OR gate 23 provides a second, negative-going phase error pulse $Pe_2$ whose leading edge is coincident with the trailing edge of clock pulse Pc and whose trailing edge is coincident with the trailing edge of window pulse Pw. The durations of phase error pulses $Pe_1$ and $Pe_2$ thus vary complementarily with each other according to the amount of phase difference between pulses Pw and Pc. The positive-going pulse $Pe_1$ and negative-going pulse $Pe_2$ are combined at junction A so that the potential thereat is driven to a high voltage level H in the presence of the pulse $Pe_1$ and driven to a lower voltage level L in the presence of the pulse $Pe_2$ for complementary periods of time as shown at Pe in FIG. 2 on detection of a phase difference.

Noise suppressor 16 is formed by a pair of antiparallel-connected diodes 28 and 29. The phase error voltage having amplitudes greater than the thresholds of diodes 28 and 29 are passed to the inverting input of operational amplifier 30. Small amplitude noise components which might be present in the phase error voltage at junction A are therefore blocked.

A series circuit of integrating resistor 31 and capacitor 32 is connected between the output of amplifier 30 and the inverting input thereof to permit operational amplifier 30 to provide detection of a difference potential between the voltage applied to the inverting input and a reference voltage applied to its noninverting input and provide integration of the difference potential. Operational amplifier 30 drives the oscillator 19 to control its frequency and phase to maintain clock and window pulses in proper phase relationship.

The loop gain of the phase-locked loop 10 is determined by the reference voltage developed by reference circuit 14. This circuit comprises a pair of Exclusive-OR gates 33 and 34 and a resistor network formed by a first series of resistors 35 and 36 and a second series of resistors 37 and 38, both being connected across the outputs of Exclusive-OR gates 33 and 34. First input terminals of Exclusive-OR gates 33 and 34 are coupled together to the input terminal 20 and their second inputs are connected respectively to high and low level voltages corresponding to binary "1" and "0", respectively. A junction between resistors 35 and 36 is connected to a high-level voltage source and a junction B between resistors 37 and 38 is connected to the noninverting input of operational amplifier 30. Resistors 37 and 38 combine to form an adder circuit with which the output of Exclusive-OR gates 33 and 34 are arithmetically summed at junction B. Exclusive-OR gate 33 has the effect of generating a series of pulses having an opposite polarity to those applied to the input terminal 20 and Exclusive-OR gate 34 has the effect of generating a series of pulses which is the replica of the input EFM bit stream. Therefore, the output pulses from Exclusive-OR gates 33 and 34 are opposite in polarity to each other and canceled at junction B. Resistors 35, 36, 37 and 38 determine the reference voltage at junction B and hence the loop gain. The application of EFM input bit stream to Exclusive-OR gates 33 and 34 causes the reference voltage to vary simultaneously with the occurrence of a phase error voltage. This improves the transient response of the phase-locked loop. The input signal to Exclusive-OR gates 33 and 34 may alternatively be taken from the output of NAND gate 21 as indicated by a broken-line 39. Since the reference circuit is identical in configuration to a portion of the phase comparator 14, the reference voltage varies with the output of phase comparator 14 under varying temperature and humidity conditions.

In this way, the voltage-controlled oscillator 19 is controlled by the time-integral value of the difference between voltage inputs to operational amplifier 30. The output of voltage controlled oscillator 19 is connected to an output terminal 70 from which clock pulses are supplied to a utilization circuit, not shown.

When the clock pulse deviates from normal frequency, the phase-locked loop 10 receives a frequency error signal from the frequency comparator 12 through terminal 42.

Referring to FIG. 1B, frequency comparator 12 comprises an interval counter 43, a decoder 44 and a delay and error voltage generator 45. Interval counter 43 includes an edge detector 46 which receives the input EFM bit stream through terminal 40 to generate a narrow pulse in response to the transition at each rising and falling edge of the incoming bit stream for enabling a counter 47 and latches 48 and 49. Counter 47 is arranged to count the clock pulse supplied from the oscillator 19 through terminal 41 in response to an enable pulse from edge detector 46 and is reset in response to the arrival of the next enable pulse. The output of counter 47 is a binary code representing the number of clock pulses present in each successive pulse duration and pulse separation of the input bit stream. This binary code output is fed to latch 48 in response to the enable pulse. The count stored in latch 48 is fed to decoder 44 on the one hand and transferred to second latch 49 on the other. Thus, the counts in latches 48 and 49 represent a pulse duration and a pulse separation, respectively, or vice versa, that occur in succession in the input bit stream. As described previously, the frame sync code comprises two successive intervals of 11 bits of binary "1"s and 11 bits of binary "0"s. If the clock frequency is normal, a clock count "11" is stored in each of the latches 48 and 49 at the beginning of each frame.

Decoder 44 comprises a pair of digital comparators 50 and 51 and a logic gate circuit including OR gates 52, 53, 57 and AND gates 54, 55 and 56. Comparators 50 and 51 compare the outputs of latches 48 and 49 respectively with a reference value "eleven" and generate a first output when the count is greater than eleven and a second output when it is equal to eleven. The first and second outputs of these comparators are applied through OR gates 52 and 53, respectively, to AND gate 54 to generate a pulse $S_1$ when the total value of counts stored in latches 48 and 49 is equal to or greater than twenty-two (22). Pulse $S_1$ is thus generated in response to each frame sync when the clock frequency is equal to or higher than normal. Thus, the absence of this pulse indicates that the clock frequency is lower than normal. AND gate 55 combines the output of OR gate 53 and the first output of comparator 50 and AND gate 56 combines the output of OR gate 52 and the first output of comparator 51. OR gate 57 combines the outputs of AND gates 55 and 56 to produce a pulse $S_2$ when the total value of counts stored in latches 48 and 49 is equal to or greater than twenty-three (23). Pulse $S_2$ is thus generated when the clock frequency is higher than normal.

Delay and error voltage generator 45 comprises a retriggerable monostable multivibrator 58 responsive to pulse $S_1$ from AND gate 54 and voltage dividing resistors 59 and 60. Further included in this circuit are monostable multivibrators 61 and 62 connected in series from OR gate 57 to respond to pulse $S_2$, an AND gate 63, a retriggerable monostable multivibrator 64 and voltage dividing resistors 65 and 66. Resistors 60 and 66 combine to form an analog adder circuit to provide a voltage output which represents an arithmetical summation of the voltage outputs of the monostable multivibrators 58 and 64.

Figure 3:
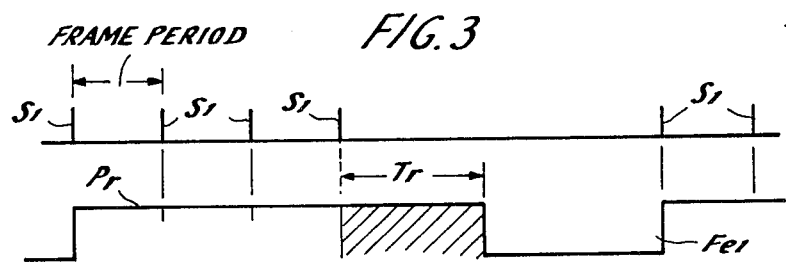
FIGS. 3 and 4 are waveform diagrams useful for describing the operation of the frequency comparator of FIG. 1B.

Retriggerable monostable multivibrator 58 generates a pulse having a duration Tr longer than the frame period (=588 clock pulses) in response to the arrival of a pulse $S_1$. If the clock frequency is equal to or higher than normal, the pulse $S_1$ is generated at periodic frame intervals, causing the monostable 58 to generate an output pulse Pr shown at FIG. 3. As long as the VCO frequency is maintained at normal frequency, the output of monostable 58 is at high voltage level and resistors 59 and 60 supply a high voltage output to terminal 42. If the clock frequency drops below normal, pulse $S_1$ no longer exists. Should this condition last for a period longer than the period Tr of monostable 58, the output of this monostable is reduced to a low level until the clock frequency is restored to normal, providing a negative-going, frequency error voltage pulse $Fe_1$ to terminal 42 (FIG. 3).

Figure 4:
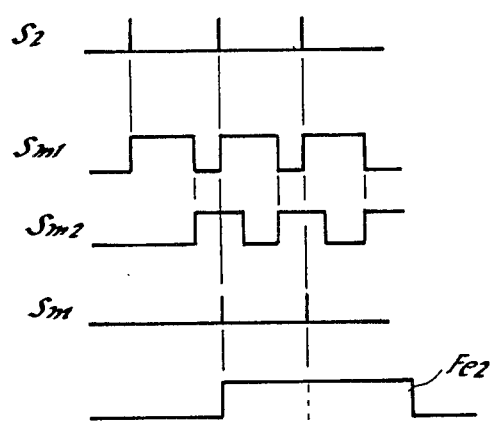

On the other hand, pulse $S_2$ drives monostable 61 to cause it to generate a pulse $Sm_1$ with a duration smaller than the frame period as shown at FIG. 4. Pulse $Sm_1$ in turn drives monostable 62 to generate a second pulse $Sm_2$ with a duration smaller than the frame period. The total period of pulses $Sm_1$ and $Sm_2$ is greater than a frame period but smaller than two frame periods, so that pulse $S_2$ on a second occurrence will coincide with second pulse $Sm_2$. AND gate 63 is enabled in response to pulse $Sm_2$ to pass a pulse $S_2$ as an output Sm to retriggerable multivibrator 64 in the event that the clock frequency remains higher than normal for a period greater than a frame period. Retriggerable monostable multivibrator 64 is triggered in response to the pulse Sm on a first occurrence to generate a positive-going, frequency control voltage pulse $Fe_2$. This retriggerable monostable multivibrator has a period slightly greater than a frame period. Therefore, if the clock frequency is still higher than normal, pulse Sm of a second occurrence will be generated to cause the multivibrator 64 to be retriggered.

From the foregoing, it will be seen that when the clock frequency is normal the total number of counts in latches 48 and 49 equals 2N (where N is the number of bits in each of the positive- and negative-going pulses of the frame sync, i.e. 11), and pulses $S_1$ are generated but pulse $S_2$ is not generated. The output of monostable multivibrator 58 is high and the output of monostable multivibrator 64 is low. Resistors 60 and 66 combine these high and low voltages to produce a frequency control voltage Fe at terminal 42 having a medium voltage level. This voltage is supplied through noise suppressor 17 to the inverting input of operational amplifier 30. This medium voltage represents a neutral point at which the oscillator 19 is controlled to establish a phase-locked condition. Noise suppressor 17 includes a pair of antiparallel-connected diodes 67 and 68 to pass the voltage having amplitudes higher than the thresholds of these diodes to thereby suppress any noise component contained in the frequency error voltage.

When the clock frequency drops below normal, the total number of counts in the latches 48 and 49 becomes equal to or smaller than 2N−1. Pulses $S_1$ and $S_2$ are not present in this condition. Retriggerable multivibrator 58 remains high for period Tr after the cessation of pulse $S_1$, whereupon it switches to a low output state. Since retriggerable multivibrator 64 has also been at low output state, the frequency control voltage Fe becomes lower than the neutral level. The inverting input of operational amplifier 30 is biased in a direction tending to cause the oscillator 19 to raise its output frequency. This low voltage bias is present continuously until the occurrence of a pulse $S_1$ when the oscillator frequency restores to normal.

Conversely, when the clock frequency rises above normal, the total number of counts in latches 48 and 49 equals 2N+1 and pulses $S_1$ and $S_2$ are generated. The presence of pulses $S_1$ causes the output of retriggerable multivibrator 58 to switch to a high voltage as in the normal stage. If the pulses $S_2$ occur in succession, retriggerable multivibrator 64 is triggered in response to the second of the pulses $S_2$ to generate a high output voltage. The high voltages at the outputs of multivibrators 58 and 64 are summed up to raise the potential at terminal 42 to a level higher than the neutral level. The inverting input of operational amplifier 30 is biased in a direction tending to cause the oscillator 19 to lower its output frequency. Retriggerable multivibrator 64 will be retriggered in response to a pulse $S_2$ at third occurrence if the clock frequency is still higher than normal. When clock frequency returns to normal, the pulse $S_2$ is no longer present and retriggerable multivibrator 64 is allowed to switch to a low voltage state one frame period after the occurrence of the third pulse $S_2$, causing the error voltage Fe at terminal 42 to decrease to the neutral point. The high voltage bias is thus present continuously until the disappearance of pulse $S_2$ when the oscillator frequency restores to normal.

Figure 5:
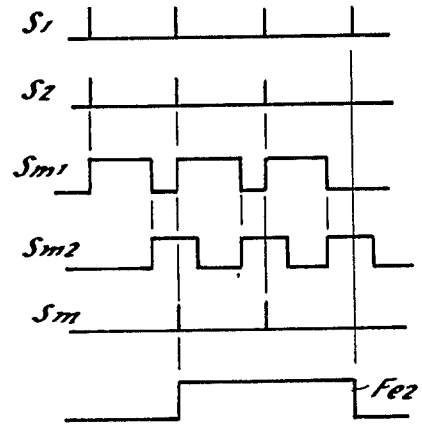
FIG. 5 is a waveform diagram useful for describing the operation of the frequency comparator of FIG. 1C.

Retriggerable monostable multivibrator 64 can be replaced with a flip-flop 71, shown at FIG. 1C. This flip-flop has a set input connected to the output of AND gate 63 and a reset input connected to the output of AND gate 54 to receive pulses Sm and $S_1$ respectively. As illustrated in FIG. 5, the operation of the frequency comparator 12 with flip-flop 71 is similar to that just described with the exception that flip-flop 71 is triggered into a set condition in response to pulse Sm preferentially to the application of pulse $S_1$ to its reset terminal. Upon the disappearance of pulses $S_2$, the flip-flop 71 is triggered into a reset condition in response to a pulse $S_1$ that occurs immediately after the clock frequency returns to normal. The frequency error voltage Fe is thus sharply terminated in response to the next frame sync immediately after the disappearance of pulses $S_2$.

Since the frequency comparator of the invention utilizes the periodicity of frame sync in the input EFM bit stream, the frequency error pulses $S_1$ and $S_2$ occur quickly in response to the phase-locked loop going beyond its capture range and in sufficient numbers during the out-of-phase condition. Phase-locked condition can therefore be readily reestablished. As a result, the clock generator of the invention has a wider capture range than conventional clock generators in which the occurrences of data bits having predetermined periodic intervals are detected to derive frequency error control voltages.

The delayed responses provided by retriggerable monostable multivibrator 58 and monostable multivibrators 61 and 62 have the effect of stabilizing the phase-locked loop against rapidly varying transients. Depending on the loop gain of the phase-locked loop, the delayed responses can be reduced or eliminated.

Figure 6:
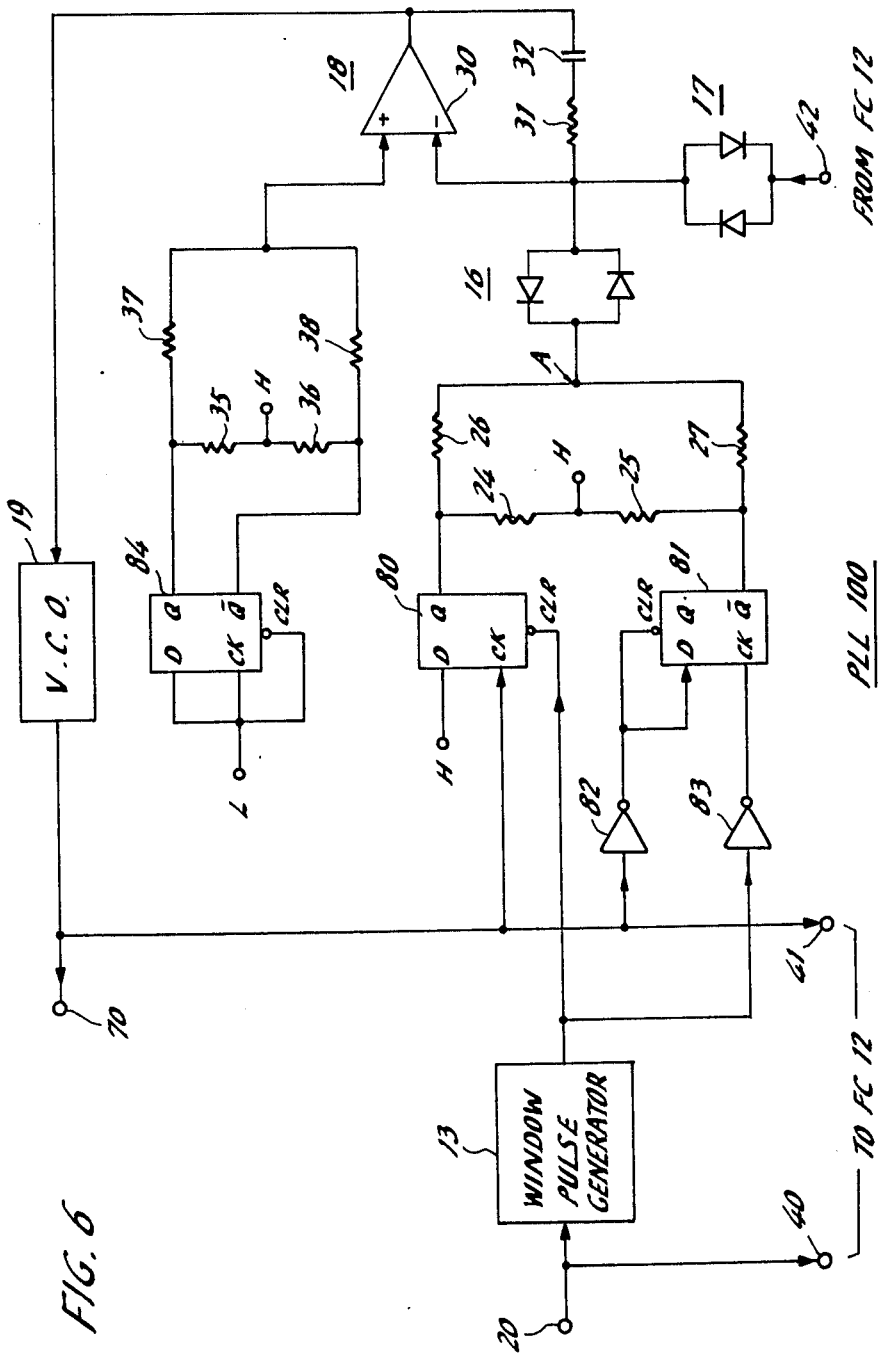
FIG. 6 is a block diagram of a modified phase-locked loop of the invention.

FIG. 6 is an illustration of an alternative embodiment of the phase-locked loop which is generally shown at numeral 100 and in which parts corresponding to those in FIG. 1A are marked with the same numerals as used in FIG. 1A. The phase-locked loop 100 differs from the phase-locked loop 10 in that D flip-flops 80, 81, 84 and inverters 82 and 83 replace the Exclusive-OR gates 22, 23, 33, 34 and NAND gate 21 of FIG. 1A. The output of window pulse generator 13 is applied to the clear input of flip-flop 80 and through inverter 83 to the clock input of flip-flop 81. Whereas, the output of voltage-controlled oscillator 19 is connected to the clock input of flip-flop 80 whose data input is impressed with a logical high voltage and through inverter 82 to the data and clear terminals of flip-flop 81. The true Q output of flip-flop 80 and the complementary Q output of flip-flop 81 are connected to the resistor network formed by resistors 24 to 27. Flip-flop 84 has its data, clock and clear input terminals coupled together to the logical low voltage source and its true and complementary Q outputs connected to resistors 35 to 38.

Figure 7A:
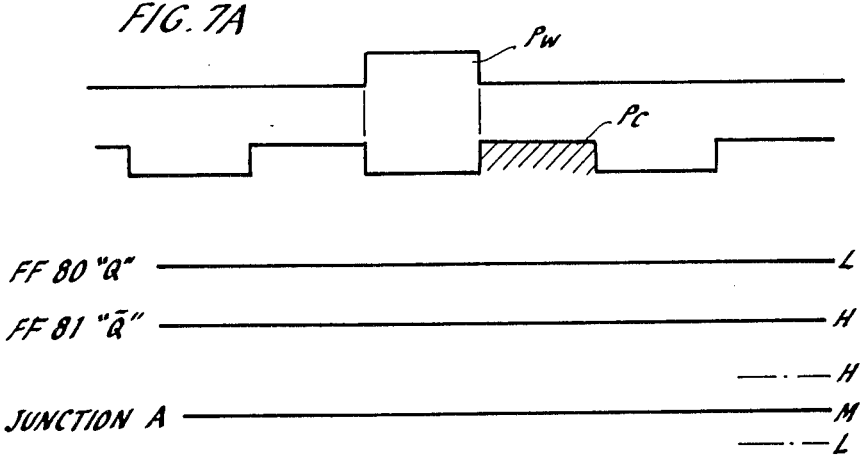
FIGS. 7A to 7C are waveform diagrams associated with the block diagram of FIG. 6.
Figure 7B:
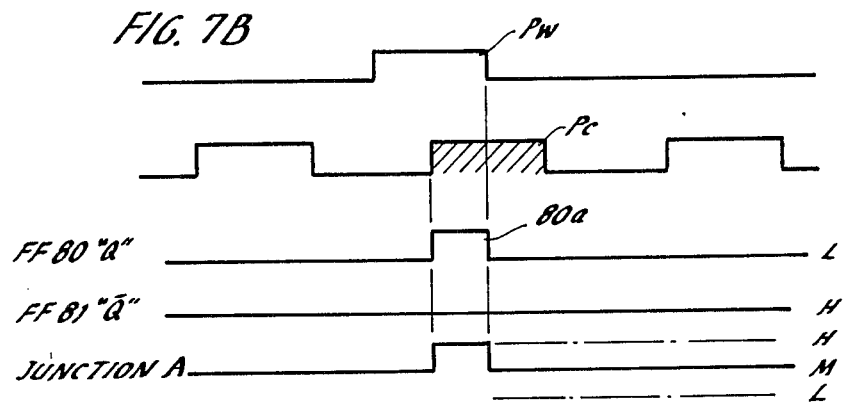
Figure 7C:
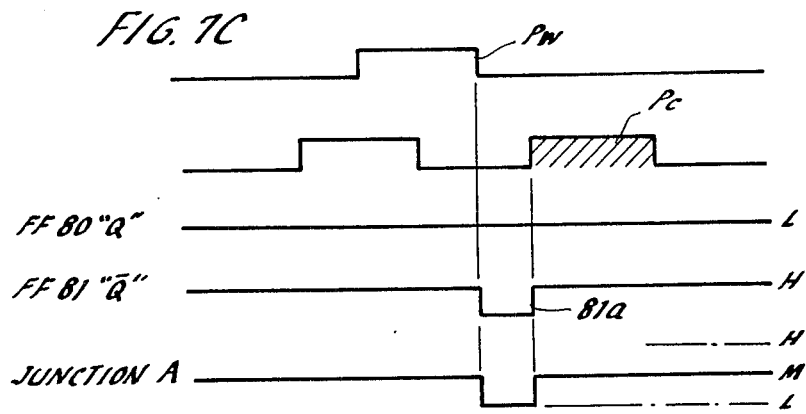

The operation of the phase-locked loop 100 is as follows. When clock pulses Pc are phase-locked with window pulses Pw as shown at FIG. 7A, the voltages at the outputs of flip-flops 80 and 81 are low and high, respectively, which are combined to produce a medium voltage M at junction A. When the clock pulse advances with respect to the window pulse, flip-flop 80 produces a positive-going pulse 80a (FIG. 7B) having a leading edge coincident with the leading edge of a clock pulse and a trailing edge coincident with the trailing edge of the window pulse, while the output of flip-flop 81 remains high. The positive-going pulse 80a is combined with the high voltage at the output of flip-flop 81 to cause the potential at junction A to rise to a level higher than medium level M during the period of pulse 80a to cause the oscillator 19 to lag the phase of the clock pulse in proportion to the amount of phase advance. If the clock pulse lags with respect to the window pulse, flip-flop 80 remains at low voltage state while flip-flop 81 generates a negative-going pulse 81a, as shown at FIG. 7C. This pulse has a leading edge coincident with the trailing edge of window pulse Pw and a trailing edge coincident with the leading edge of clock pulse Pc. The potential at junction A is reduced to a level lower than the medium level during the period of the pulse 81a to cause the oscillator 19 to advance the clock phase in proportion to the amount of phase lag.

The embodiments described above are particularly useful for adaptation to integrated circuits.

What is claimed is:

1. A clock generator adapted to receive a digital bit stream having data bits and a synchronization code between prescribed numbers of the data bits, comprising:

a voltage-controlled oscillator for generating clock pulses having a frequency and a phase which are variable in response to an input signal applied thereto;

means responsive to said digital bit stream for generating a window pulse having a pulse duration smaller than the pulse spacing of said clock pulses in response to a predetermined transition binary "1"s and binary "0"s in said bit stream;

a phase comparator responsive to said window and clock pulses for generating a phase control signal representing the difference in phase between said window pulse and said clock pulse;

a frequency comparator responsive to said bit stream and said clock pulses for detecting said synchronization code and detecting the clock pulses present during the period of the detected synchronization code and generating a frequency control signal having an amplitude variable as a function of the number of the detected clock pulses; and means for combining said phase control signal and said frequency control signal and applying the combined signals to said voltage-controlled oscillator as said input signal.

2. A clock generator as claimed in claim 1, wherein said decoder comprises means for detecting when the count in said counter is equal to k and said error voltage generator includes means for generating said frequency control signal having a medium level between said first and second levels when the count is detected as being equal to k by the detecting means.

3. A clock generator as claimed in claim 1, wherein said frequency comparator includes means for introducing a delay time to said frequency control signal upon the occurrence of same.

4. A clock generator as claimed in claim 2, wherein said decoder comprises:

means for generating a first signal when said count is equal to or greater than k and generating said first signal and a second simultaneously signal when said count is equal to or greater than k+1, and wherein said error signal generator comprises:
a first retriggerable monostable multivibrator responsive to said first signal for generating a first output pulse having a duration greater than the period of said synchronization code;
delay gate means responsive to said second signal to generate an output upon receipt of a prescribed number of said second signals;
a second retriggerable monostable multivibrator responsive to the output of the delay gate means for generating a second output pulse having a duration slightly greater than the period of said synchronization code; and
means for summing said first and second output pulses to generate said frequency control signal.

5. A clock generator as claimed in claim 2, wherein said decoder comprises:
means for generating a first signal when said count is equal to or greater than k and generating said first signal and a second simultaneously signal when said count is equal to or greater than k+1, and wherein said error signal generator comprises:
a retriggerable monostable multivibrator responsive to said first signal for generating a first output pulse having a duration greater than the period of said synchronization code;
delay gate means responsive to said second signal to generate an output upon receipt of a prescribed number of said second signals;
a bistable device responsive to the output of the delay gate means and said first signal for generating a second output pulse having a leading edge coincident with the time of application of the delay gate means output thereto and a trailing edge coincident with the time of application of said first signal thereto in the absence of said delay gate means output; and
means for summing said first and second output pulses to generate said frequency control signal.

6. A clock generator as claimed in claim 1, wherein said clock pulse and said window pulse have the same pulse duration and the pulse spacing of said clock pulses is twice the pulse duration of the window pulse.

7. A clock generator as claimed in claim 1, wherein said clock pulse and said window pulse have the same pulse duration and the pulse spacing of said clock pulses is twice the pulse duration of the window pulse.

8. A clock generator adapted to receive a digital bit stream having data bits and a synchronization code between prescribed numbers of the data bits, comprising:
a voltage-controlled oscillator for generating clock pulses;
means for generating a window pulse in response to a predetermined transition between binary "1"s and binary "0"s in said bit stream;
a phase comparator responsive to said window and clock pulses for generating a phase control signal representing the difference in phase between said window pulse and said clock pulse;
a frequency comparator responsive to said bit stream and said clock pulses for detecting said synchronization code and detecting the clock pulses present during the period of the detected synchronization code and generating a frequency control signal having an amplitude variable as a function of the number of the detected clock pulses; and
means for combining said phase and frequency control signals and applying the combined signals to said voltage-controlled oscillator to control the phase and frequency of said clock pulses
wherein said synchronization code comprises a series of k bits, where k is an integer, said frequency comparator comprising:
an edge detector responsive to said bit stream for detecting such transition between binary "1"s and binary "0"s in said bit stream;
a counter for counting said clock pulses during the interval between successively detected transitions;
a decoder for detecting whether the count in said counter is equal to or smaller than k−1 or equal to or greater than k+1; and
an error voltage generator for generating said frequency control signal at one of first and second levels depending on whether the count detected by said detecting means is equal to or smaller than K−1 or equal to or greater than k+1.

9. A clock generator adapted to receive a digital bit stream having data bits and a synchronization code between prescribed numbers of the data bits, comprising:
a voltage-controlled oscillator for generating clock pulses;
means for generating a window pulse in response to a predetermined transition between binary "1"s and binary "0"s in said bit stream;
a phase comparator responsive to said window and clock pulses for generating a phase control signal representing the difference in phase between said window pulse and said clock pulse;
a frequency comparator responsive to said bit stream and said clock pulses for detecting said synchronization code and detecting the clock pulses present during the periods of the detected synchronization code and generating a frequency control signal having an amplitude variable as a function of the number of the detected clock pulses; and
an integrator for providing an integrated output to said voltage-controlled oscillator,
wherein said phase comparator comprises means for generating a first pulse having duration variable as a function of the difference between a predetermined edge of said clock pulse and a leading edge of said window pulse and a second pulse having a duration variable as a function of the difference between said predetermined edge and a trailing edge of said window pulse and applying said first and second pulses to said integrator.

10. A clock generator as claimed in claim 9, wherein said integrator comprises a differential integrator having first and second input terminals, and wherein said phase comparator comprises:
a coincidence gate responsive to said window and clock pulses for generating a coincidence pulse with a duration representative of the difference in phase between said window and clock pulses;
a pair of first and second Exclusive-OR gates each having first and second input terminals, the first input terminals of the Exclusive-OR gates being coupled together to be responsive to said coincidence pulse, the second input terminal of said first Exclusive-OR gate being responsive to said window pulse and the second input terminal of said second Exclusive-OR gate being at a predetermined potential; and a first voltage dividing resistor network for combining output signals from said first and second Exclusive-OR gates and applying the combined output signals to said first input terminal of the differential integrator, further comprising a reference voltage generator which comprises:

a pair of third and fourth Exclusive-OR gates each having first and second input terminals;

means for applying predetermined potentials to said first and second input terminals of the third and fourth Exclusive-OR gates so that the third and fourth Exclusive-OR gates generate voltages of opposite polarity; and a second voltage dividing resistor network identical to the first resistor network for combining said opposite polarity voltages and applying the combined voltages to said second input terminal of the differential integrator.

11. A clock generator as claimed in claim 10, wherein said potential applying means comprises means for applying said bit stream to the first input terminals of said third and fourth Exclusive-OR gates.

12. A clock generator as claimed in claim 10, wherein said potential applying means comprises means for applying said coincidence pulse to the first input terminals of said third and fourth Exclusive-OR gates.

13. A clock generator as claimed in claim 9, wherein said clock pulse and said window pulse have the same pulse duration and the pulse spacing of said clock pulses is twice the pulse duration of the window pulse.

14. A clock generator adapted to receive a digital bit stream having data bits and a synchronization code between prescribed numbers of data bits, comprising:

a voltage-controlled oscillator for generating clock pulses;

means for generating a window pulse in response to a predetermined transition between binary "1"s and binary "0"s in said bit stream; a phase comparator responsive to said window and clock pulses for generating a phase control signal representing the difference in phase between said window pulse and said clock pulse;

a frequency comparator responsive to said bit stream and said clock pulses for detecting said synchronization code and detecting the clock pulses present during the period of the detected synchronization code and generating a frequency control signal having an amplitude variable as a function of the number of the detected clock pulses; and an integrator for providing an integrated output to said voltage-controlled oscillator, wherein said phase comparator comprises means for generator a first pulse having a duration variable as a function of the difference between a predetermined edge of said clock pulse and a predetermined edge of said window pulse when said clock pulse is advanced with respect to said window pulse and a second pulse having a duration variable as a function of the difference between said predetermined edges of said clock and window pulses when said clock pulse lags with respect to said window pulse and applying said first and second pulses to said integrator.

15. A clock generator as claimed in claim 14, wherein said integrator comprises a differential integrator having first and second input terminals, and wherein said phase comparator comprises:

a pair of first and second D flip-flops;

means for applying said window and clock pulses to said first and second D flip-flops to generate said first and second pulses at the outputs of the first and second D flip-flops;

a first voltage dividing resistor network for connecting the output terminals of said first and second D flip-flops and providing a combined output to said first input terminal of the differential integrator, further comprising a reference voltage generator which comprises:

a third D flip-flop;

means for applying predetermined potentials to said third D flip-flop to cause it to generate voltages of opposite polarity; and a second voltage dividing resistor network identical in configuration to the first resistor network for combining said opposite polarity voltages and applying the combined voltages to said second input terminal of the differential integrator.

16. A clock generator as claimed in claim 14, wherein said clock pulse and said window pulse have the same pulse duration and the pulse spacing of said clock pulses is twice the pulse duration of the window pulse.

17. A clock generator adapted to receive a digital bit stream having data bits and a synchronization code having a consecutive series of N bits of "1"s and N bits of "0"s, where N is an integer greater than unity comprising:

a voltage-controlled oscillator for generating clock pulses;

means for generating a window pulse in response to a predetermined transition between binary "1"s and binary "0"s in said bit stream;

a phase comparator responsive to said window and clock pulses for generating a phase control signal representing the difference in phase between said window pulse and said clock pulse;

an edge detector responsive to said bit stream for detecting each transition between binary "1"s and binary "0"s in said bit stream;

means for counting said clock pulses during the interval between successively detected transitions and developing first and second counts representing the numbers of the clock pulses present in the successive intervals;

a decoder for detecting whether the total value of said first and second counts is equal to or smaller than $2N-1$ or equal to or greater than $2N+1$;

an error voltage generator for generating said frequency control signal at one of first and second levels depending on whether said total value is equal to or smaller than $2N-1$ or equal to or greater than $2N+1$; and means for combining said phase and frequency control signals and applying the combined signals to said voltage-controlled oscillator to control the phase and frequency of said clock pulses.

18. A clock generator as claimed in claim 17, wherein said decoder comprises means for detecting when said total value is equal to 2N and said error voltage generator includes means for generating said frequency control signal having a medium level between said first and second levels when said total value is equal to 2N by the detecting means.

19. A clock generator as claimed in claim 17, wherein said frequency comparator includes means for introducing a delay time to said frequency control signal upon the occurrence of same.

20. A clock generator as claimed in claim 18, wherein said decoder comprises:
  means for generating a first signal when said count is equal to or greater than N and generating said first signal and a second simultaneously signal when said count is equal to or greater than N+1, and wherein said error signal generator comprises:
  a first retriggerable monostable multivibrator responsive to said first signal for generating a first output pulse having a duration greater than the period of said synchronization code;
  delay gate means responsive to said second signal to generate an output upon receipt of a prescribed number of said second signals;
  a second retriggerable monostable multivibrator responsive to the output of the delay gate means for generating a second output pulse having a duration slightly greater than the period of said synchronization code; and
  means for summing said first and second output pulses to generate said frequency control signal.

21. A clock generator as claimed in claim 18, wherein said decoder comprises:
  means for generating a first signal when said total value is equal to or greater than 2N and generating said first signal and a second signal simultaneously when said total value is equal to or greater than 2N+1, and wherein said error signal generator comprises:
  a retriggerable monostable multivibrator responsive to said first signal for generating a first output pulse having a duration greater than the period of said synchronization code;
  delay gate means responsive to said second signal to generate an output upon receipt of a prescribed number of said second signals;
  a bistable device responsive to the output of the delay gate means and said first signal for generating a second output pulse having a leading edge coincident with the time of application of the delay gate means output thereto and a trailing edge coincident with the time of application of said first signal thereto in the absence of said delay gate means output; and
  means for summing said first and second output pulses to generate said frequency control signal.

22. A clock generator as claimed in claim 18, wherein said decoder comprises:
  a pair of digital comparators for comparing said first and second counts with a count equal to N and a logic gate circuit responsive to output signals from said digital comparators for generating a first logic output when the total of said first and second count values is equal to or greater than 2N and a second logic output when the total of said first and second count values is equal to or greater than 2N+1, and wherein said error voltage generator comprises:
  a first retriggerable monostable multivibrator responsive to said first logic output for generating a first output pulse having a duration greater than the period of said synchronization code;
  delay gate means responsive to said second logic output for generating an output upon receipt of a prescribed number of said second signals;
  a second retriggerable monostable multivibrator responsive to the output of said gate means for generating a second output pulse having a duration slightly greater than said period of synchronization code; and
  means for summing said first and second output pulses to generate said frequency control signal.

23. A clock generator as claimed in claim 18, wherein said decoder comprises:
  a pair of digital comparators for comparing said first and second counts with a count equal to N and a logic gate circuit responsive to output signals from said digital comparators for generating a first logic output when the total of said first and second count values is equal to or greater than 2N and a second logic output when the total of said first and second count values is equal to or greater than 2N+1, and wherein said error voltage generator comprises:
  a retriggerable monostable multivibrator responsive to said first logic output for generating a first output pulse having a duration greater than the period of said synchronization code;
  delay gate means responsive to said second logic output for generating an output upon receipt of a prescribed number of said second signals;
  a bistable device responsive to the output of the delay gate means and said first logic output from said decoder for generating a second output pulse having a leading edge coincident with the time of application thereto of the delay gate means output and a trailing edge coincident with the time of application thereto of said first logic output in the absence of said delay gate means output; and
  means for summing said first and second output pulses to generate said frequency control signal.

24. A clock generator as claimed in claim 17, wherein said signal combining means comprises an integrator for providing an integrated output to said voltage-controlled oscillator, and wherein said phase comparator comprises means for generating a first pulse having a duration variable as a function of the difference between a predetermined edge of said clock pulse and a leading edge of said window pulse and a second pulse having a duration variable as a function of the difference between said predetermined edge and a trailing edge of said window pulse and applying said first and second pulses to said integrator.

25. A clock generator as claimed in claim 17, wherein said signal combining means comprises an integrator for providing an integrated output to said voltage-controlled oscillator, and wherein said phase comparator comprises means for generating a first pulse having a duration variable as a function of the difference between a predetermined edge of said clock pulse and a predetermined edge of said window pulse when said clock pulse is advanced with respect to said window pulse and a second pulse having a duration variable as a function of the difference between said predetermined edges of said clock and window pulses when said clock pulse lags with respect to said window pulse and applying said first and second pulses to said integrator.

26. A clock generator as claimed in claim 17, wherein said clock pulse and said window pulse have the same pulse duration and the pulse spacing of said clock pulses is twice the pulse duration of the window pulse.

* * * * *